US012647000B2

(12) United States Patent

Fujimoto et al.

(10) Patent No.: US 12,647,000 B2
(45) Date of Patent: Jun. 2, 2026

(54) SUPPORT STRUCTURE OF FUSE CIRCUIT BOARD OF MOTOR DRIVE DEVICE

(71) Applicant: Hitachi Astemo, Ltd., Hitachinaka (JP)

(72) Inventors: Masao Fujimoto, Hitachinaka (JP); Yuuichi Yanagisawa, Hitachinaka (JP); Akira Ishii, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 293 days.

(21) Appl. No.: 18/041,791

(22) PCT Filed: May 27, 2021

(86) PCT No.: PCT/JP2021/020187
§ 371 (c)(1),
(2) Date: Feb. 15, 2023

(87) PCT Pub. No.: WO2022/097320
PCT Pub. Date: May 12, 2022

(65) Prior Publication Data
US 2023/0307995 A1 Sep. 28, 2023

(30) Foreign Application Priority Data

Nov. 6, 2020 (JP) ................................. 2020-185489

(51) Int. Cl.
*H02K 11/27* (2016.01)
(52) U.S. Cl.
CPC .......... *H02K 11/27* (2016.01); *H02K 2211/03* (2013.01)
(58) Field of Classification Search
CPC .. H02K 5/225; H02K 11/25–27; H02K 11/30; H02K 11/33; H02K 2211/03
See application file for complete search history.

(56) References Cited

U.S. PATENT DOCUMENTS

2002/0105239 A1* 8/2002 Witzig ................... H02K 11/20
310/68 B
2007/0001534 A1 1/2007 Kojima et al.
(Continued)

FOREIGN PATENT DOCUMENTS

JP H23137 U 1/1990
JP H06-038058 U 5/1994
(Continued)

OTHER PUBLICATIONS

Yamashita, Machine Translation of JP2001200790, Jul. 2001 (Year: 2001).*

(Continued)

*Primary Examiner* — Eric Johnson
(74) *Attorney, Agent, or Firm* — FOLEY & LARDNER LLP

(57) ABSTRACT

A fuse circuit element (32) of a fuse module 22 for fail-safe is mounted on a fuse circuit board (31), and connected to wire terminal portions (36) made of respective wire one ends of stator coils. The fuse circuit board (31) has, as main terminals (33), through holes (33*a*) and land portions (33*b*), and the wire terminal portions (36) are soldered or welded with the wire terminal portions (36) inserted into the through holes (33*a*). The fuse circuit board (31) is supported in a cantilever manner by a pedestal portion (52), and a space (53) is secured between the fuse circuit board (31) and a surface (51) of a housing (7) around the main terminals (33). With this, soldering or welding can be performed without heat escaping during soldering or welding by the space (53).

3 Claims, 15 Drawing Sheets

(56)     References Cited

U.S. PATENT DOCUMENTS

| | | | |
|---|---|---|---|
| 2009/0251030 A1 | 10/2009 | Fujimoto et al. | |
| 2011/0080140 A1 | 4/2011 | Hogari et al. | |
| 2017/0302139 A1 | 10/2017 | Sakai | |
| 2018/0244301 A1* | 8/2018 | Fujimoto | .............. B62D 5/046 |
| 2020/0212767 A1 | 7/2020 | Yatsugi et al. | |

FOREIGN PATENT DOCUMENTS

| | | | |
|---|---|---|---|
| JP | 2001-200790 A | 7/2001 |
| JP | 2007-014147 A | 1/2007 |
| JP | 2007-288929 A | 11/2007 |
| JP | 2009-254141 A | 10/2009 |
| JP | 3166794 U | 3/2011 |
| JP | 2011-223788 A | 11/2011 |
| JP | 2015-202046 A | 11/2015 |
| JP | 2016-082719 A | 5/2016 |
| JP | 2019-022414 A | 2/2019 |
| WO | WO-2019/244243 A1 | 12/2019 |

OTHER PUBLICATIONS

Written Opinion with English Translation issued in PCT Application No. PCT/JP2021/020187 dated Jul. 20, 2021 (14 pages).
International Search Report dated Jul. 20, 2021 issued in International Application No. PCT/JP2021/020187, with English translation, 7 pages.
Notice of Reasons for Refusal dated Dec. 5, 2023 issued in JP Application No. 2022-560636, with English translation, 10 pages.

* cited by examiner

FIG. 9

SUPPORT STRUCTURE OF FUSE CIRCUIT BOARD OF MOTOR DRIVE DEVICE

TECHNICAL FIELD

The present invention relates to a motor drive device that is structured integrally with an electric motor having stator coils and drives and controls the electric motor.

BACKGROUND ART

Patent Document 1 discloses so-called electrically mechanically integrated actuator in which the electric motor and the motor drive device driving and controlling the electric motor are structured integrally with each other. In Patent Document 1, as the electric motor, a three-phase motor in which three coils are Y-connected is used, and a configuration in which neutral point relays configured by respective switching elements are provided between the coil of each phase and a neutral point for fail-safe is disclosed.

Here, the neutral point relays are mounted on a small-sized circuit board, and a pair of small-sized circuit boards mounting thereon respective inverter circuits and the small-sized circuit board for the neutral point relays are arranged or laid out at an end portion of a housing of the electric motor in the shape of a nearly U. Further, ends of wires of the stator coils are connected to the circuit board of the neutral point relays through bus bars.

In a case of the above conventional configuration, there is a need to, after fixing the bus bars to the circuit board, connect the wire ends of the stator coils to the bus bars by TIG welding etc., and it still has room for improvement in simplification of the configuration and reduction in man-hour.

CITATION LIST

Patent Document

Patent Document 1: Japanese Unexamined Patent Application Publication No. 2019-022414

SUMMARY OF THE INVENTION

As one aspect of the present invention, a motor drive device which is structured integrally with an electric motor having stator coils and drives and controls the electric motor, the motor drive device comprises: a plurality of wire terminal portions arranged so as to linearly protrude at an end portion of a housing accommodating therein the electric motor, wherein the wire terminal portions are made of respective wire one ends of the stator coils; a circuit board having a plurality of through holes into which the wire terminal portions are inserted respectively, wherein the circuit board mounts thereon apart of a power supply circuit supplying power to the stator coils; and a board supporting portion supporting the circuit board so that a space is formed between the circuit board and an outer surface, which faces the circuit board, of the housing at least around each through hole, wherein the wire terminal portions inserted into the respective through holes through the space are soldered or welded to land portions of the through holes.

According to the present invention, since the wire terminal portions inserted into the respective through holes of the circuit board are directly soldered or welded to land portions without interposing a bus bar, its configuration is simplified, and also man-hour required for mounting the bus bar can be reduced. Further, since the space is secured between the circuit board and the housing, heat is hard to escape to the housing side during soldering or welding, then easy and reliable soldering or welding can be performed.

BRIEF DESCRIPTION OF THE DRAWINGS

FIG. 9 is a perspective view showing the board supporting structure of the second embodiment.

EMBODIMENTS FOR CARRYING OUT THE INVENTION

Embodiments in which the present invention is applied to, for instance, an electric actuator device of an electric power steering device of a vehicle will be described in detail below with reference to the drawings.

Figure 1:
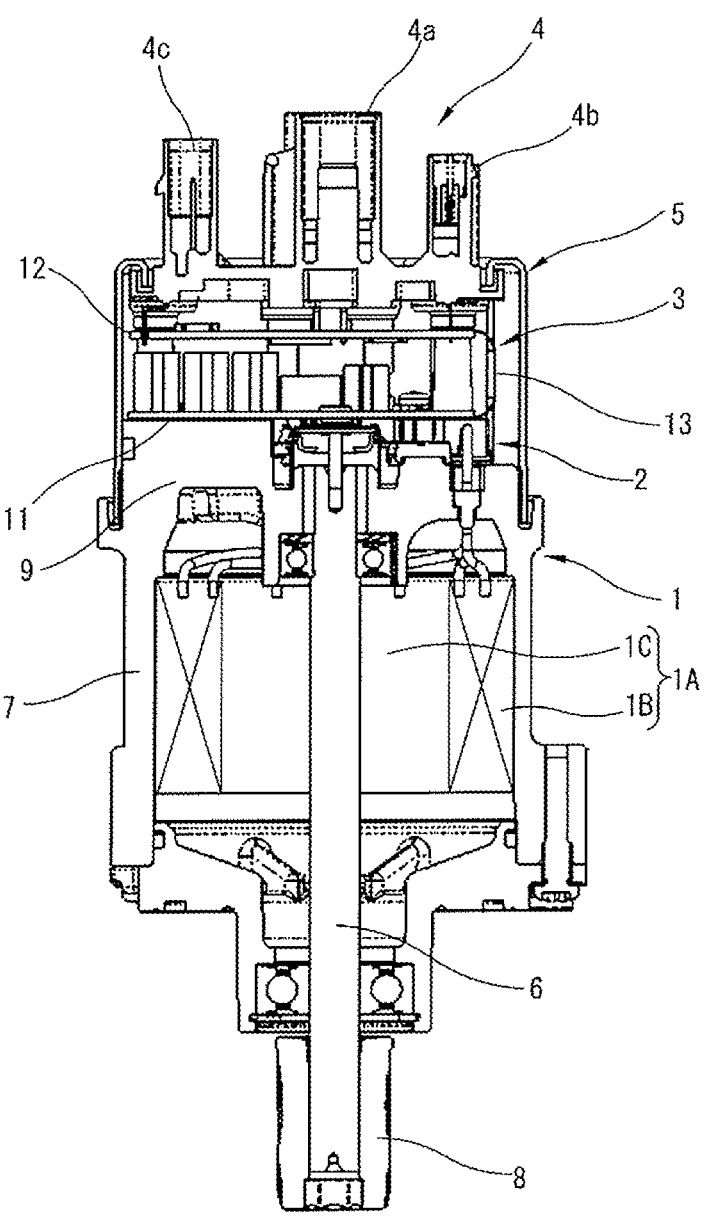
FIG. 1 is a sectional view of an electric actuator device for a power steering device, having a motor drive device according to the present invention.

FIG. 1 is a sectional view of the electric actuator device that provides a steering assist force to a steering mechanism (not shown) of the electric power steering device. This electric actuator device has a cylindrical motor unit 1, an inverter/power module unit 2, a circuit board 3 formed by a foldable multilayer wiring board, a connector member 4 where a plurality of connectors are integrated and a motor cover 5 fixed to one end portion of the motor unit 1 so as to cover or accommodate therein the inverter/power module unit 2, the circuit board 3 and the connector member 4. A motor drive device in claims is mainly formed by the inverter/power module unit 2 and the circuit board 3.

The motor unit 1 is a unit configured such that a motor 1A having a stator 1B and a rotor 1C is accommodated in a cylindrical housing 7. The motor unit 1 has a connecting portion 8 such as a gear or a spline at a top end of a rotation shaft 6 that protrudes from a top end surface of the housing 7, and is connected to the steering mechanism (not shown) through this connecting portion 8. The motor 1A is a three-phase permanent-magnet-type brushless motor. The stator 1B has three-phase stator coils of U-phase, V-phase and W-phase (hereinafter, simply referred to as coils), and permanent magnets are arranged on an outer circumferential surface of the rotor 1C.

Here, in order to secure redundancy, the motor 1A has a dual coil and corresponding permanent magnets. That is, the motor 1A has a set of coils of U-phase, V-phase and W-phase and corresponding permanent magnets for a first system and a set of coils of U-phase, V-phase and W-phase and corresponding permanent magnets for a second system.

One end portion of the housing 7, which is an opposite side to the connecting portion 8, is formed as a bottom wall portion 9 having a horseshoe shape and covering end surfaces of the stator 1B and the rotor 1C. The motor cover 5 having an outline of a horseshoe shape corresponding to the bottom wall portion 9 is fixed to the housing 7 so as to cover this bottom wall portion 9. Then, the inverter/power module unit 2, the circuit board 3 and the connector member 4 are accommodated in a space formed between the bottom wall portion 9 and the motor cover 5 with these inverter/power module unit 2, circuit board 3 and connector member 4 stacked in an axial direction of the rotation shaft 6.

The connector member 4 has three connectors that extend in a same direction along the axial direction of the rotation shaft 6. More specifically, the connector member 4 has a power connector 4a located at the middle of the connector member 4, a sensor input connector 4b inputting signals from sensors (e.g. a steering angle sensor and a torque sensor) located at a steering mechanism side and a communication connector 4c to communicate with the other control devices in the vehicle (e.g. by CAN communication). These connectors 4a, 4b and 4c protrude to the outside through an opening of the motor cover 5.

The circuit board 3 is set in a substantially U-shaped folded state between the bottom wall portion 9 and the connector member 4. That is, the circuit board 3 has a first rigid section 11 as a power-related board where a group of electronic components through which relatively large current passes for drive of the motor 1A through the inverter/power module unit 2 is mounted, a second rigid section 12 as a control-related board where control-related electronic components through which relatively small current passes are mounted, and a flexible section 13 located between the first and second rigid sections 11 and 12. The circuit board 3 is then accommodated between the housing 7 and the motor cover 5 which serve as a case or an enclosure with the flexible section 13 being bent (or deformed) such that the first and second rigid sections 11 and 12 overlapping or stacking in the axial direction of the rotation shaft 6. The first rigid section 11 and the second rigid section 12 in the folded state are supported such that each flat surface state of the first rigid section 11 and the second rigid section 12 is maintained and these flat surfaces are arranged parallel to each other while securing a distance between the first rigid section 11 and the second rigid section 12 to the extent that the electronic components mounted on the first and second rigid sections 11 and 12 do not interfere with each other.

Figure 2:
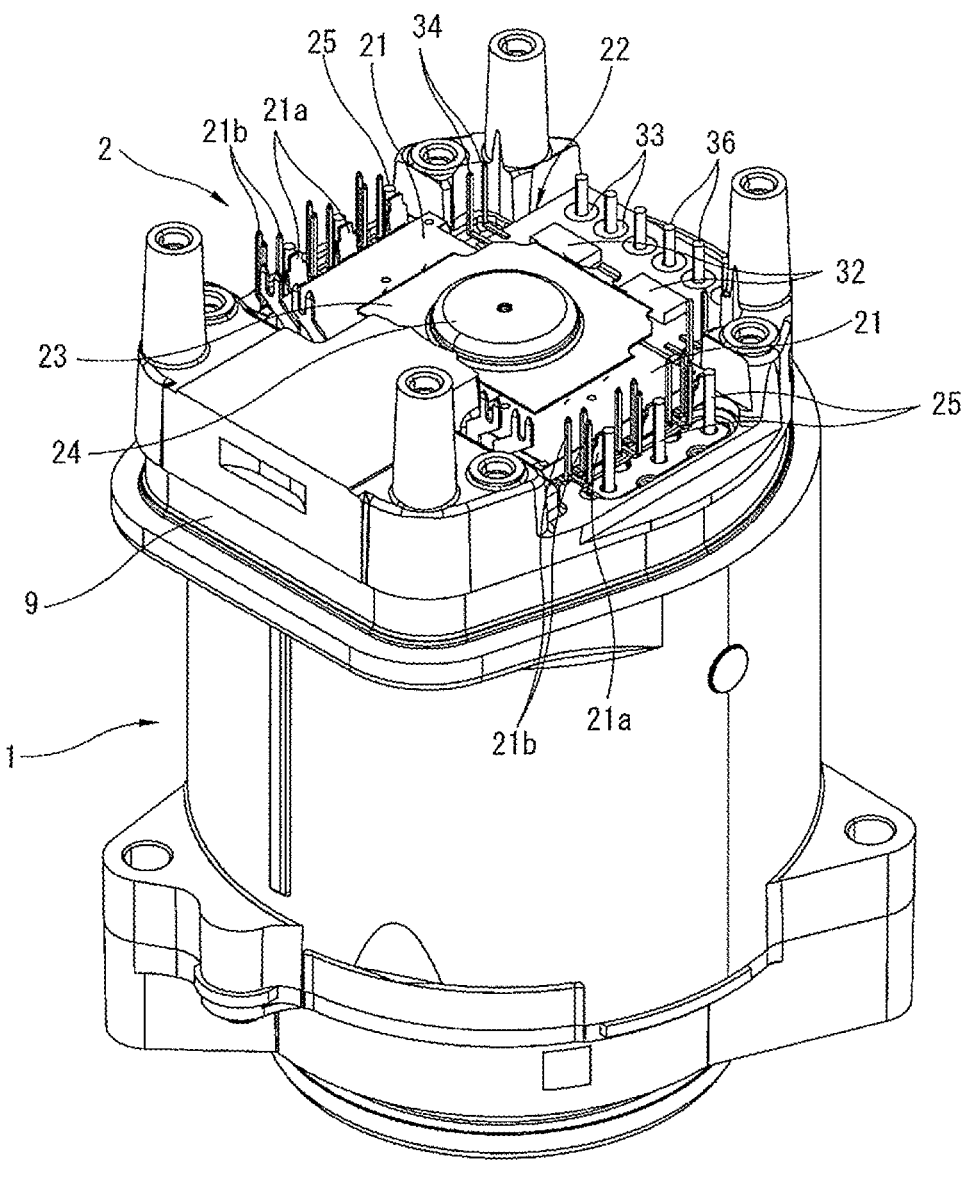
FIG. 2 is a perspective view of the electric actuator device having a fuse module according to a first embodiment.

FIG. 2 is a perspective view showing a configuration of the inverter/power module unit 2 with the motor cover 5, the connector member 4 and the circuit board 3 removed from the electric actuator device. The inverter/power module unit 2 forms a power supply circuit that supplies power to the coils of the motor 1A. As illustrated in FIG. 2, the inverter/power module unit 2 includes two inverter modules 21 corresponding to the coils of the two systems and a fuse module 22. These three modules each have an elongated rectangular shape, and are arranged so as to enclose the rotation shaft 6 with a substantially U-shaped arrangement. More specifically, the pair of inverter modules 21 are located so as to correspond to legs of the letter U with these inverter modules 21 facing each other, and the fuse module 22 is located at a position corresponding to a top of the letter U.

A surface, on the motor cover 5 side, of the bottom wall portion 9 is formed so that areas corresponding to the inverter/power module unit 2, i.e. the two inverter modules 21 and the fuse module 22, are relatively recessed. Then, the inverter modules 21 and the fuse module 22 are accommodated in these recesses. Further, in order for these inverter modules 21 and fuse module 22 to be supported on the bottom wall portion 9, a rectangular pressing member 23 made of a press-formed metal plate is arranged at a center of the motor unit 1. The pressing member 23 is attached to the bottom wall portion 9 through a bottomed cylindrical cap 24 that covers an end portion of the rotation shaft 6.

The pair of inverter modules 21 correspond to the above described two systems of the motor 1A respectively. That is, one of the inverter modules 21 supplies power to the coils of the first system, and the other of the inverter modules 21 supplies power to the coils of the second system. Each inverter module 21 is configured as one module in which a plurality of switching elements, which form upper and lower arms for U-phase, V-phase and W-phase, are accommodated in a rectangular package. Each inverter module 21 has three main terminals 21a connected to one ends of the coils of the respective phases and a plurality of control terminals 21b. The main terminal 21a is a substantially L-shaped bus bar fixed to the inverter module 21. The main terminal 21a is then welded to a wire terminal portion 25 which is made of a wire one end of the coil and protrudes from the bottom wall portion 9. Each pin-shaped control terminal 21b is connected to the circuit board 3. It is noted that the inverter module 21 is fixed by welding the main terminals 21a to the respective wire terminal portions 25.

Figure 3:
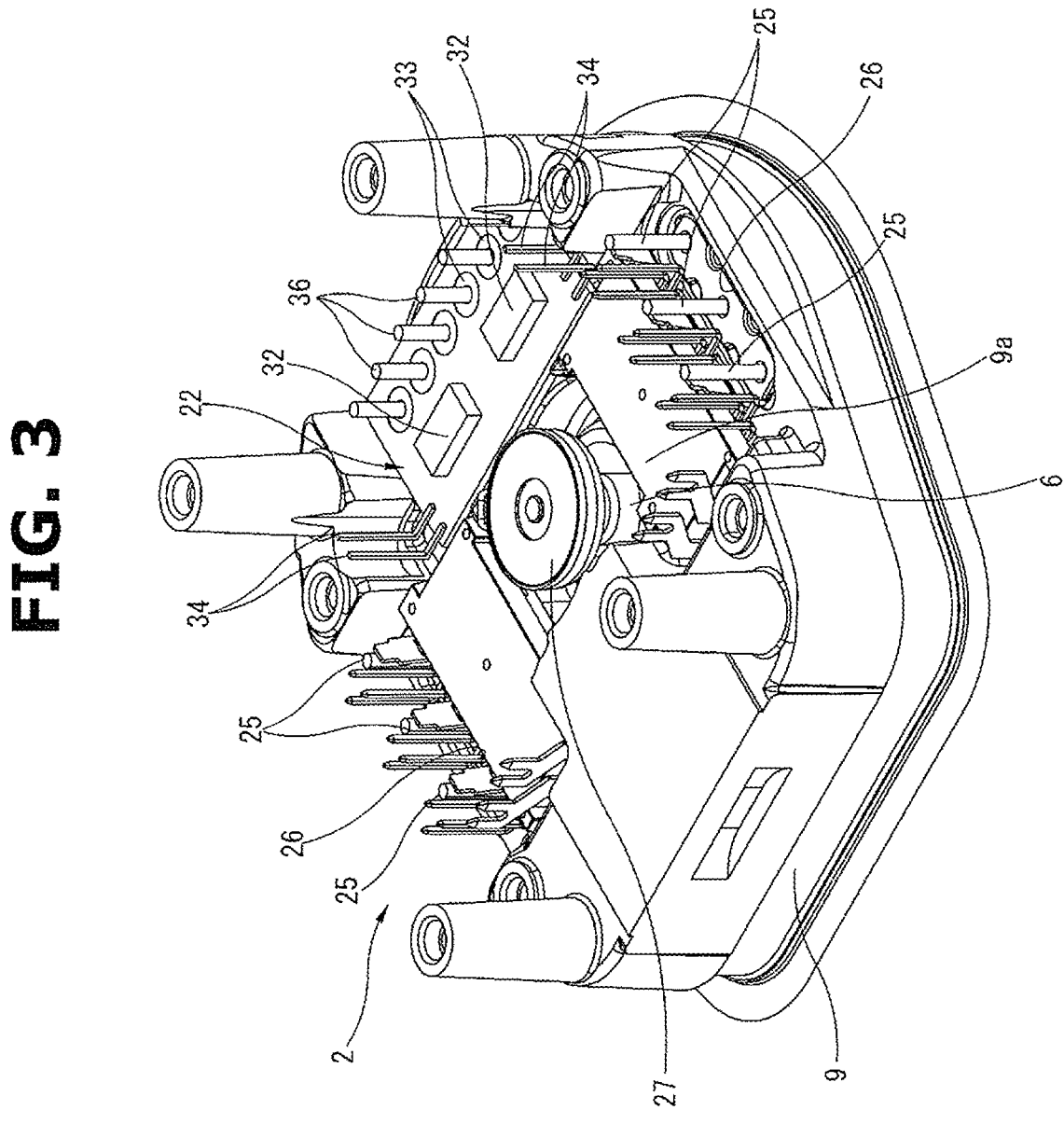
FIG. 3 is a perspective view of the electric actuator device depicted with a pressing member and inverter modules being removed.

FIG. 3 is a drawing showing the configuration with the inverter modules 21, the pressing member 23 and the cap 24 removed from the configuration of FIG. 2. As shown in FIG. 3, for each of the first system and the second system of the motor 1A, the wire terminal portions 25 formed by the linearly extending wire one ends of the coils of U-phase, V-phase and W-phase are arranged in a row (or in line). The three wire terminal portions 25 of each system penetrate the bottom wall portion 9 through an opening 26 provided at the bottom wall portion 9. Further, as illustrated in FIG. 3, a disk-shaped detected portion 27 having a permanent magnet corresponding to a rotation sensor (not shown) provided at the circuit board 3 side is attached to the end portion of the rotation shaft 6. The cap 24 is attached to a cylindrical portion 9a of the bottom wall portion 9 so as to cover this detected portion 27.

Figure 4:
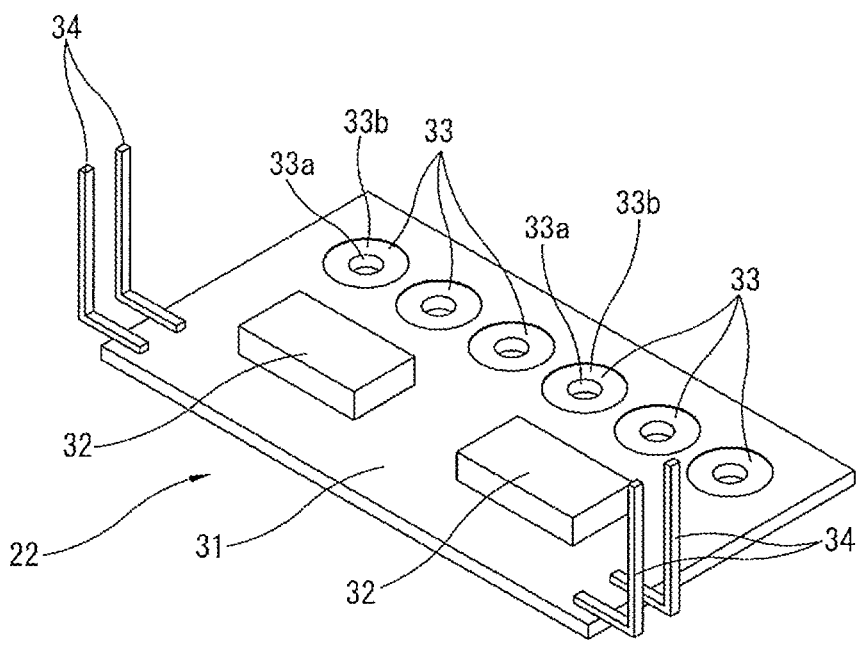
FIG. 4 is a perspective view of the fuse module of the first embodiment.

FIG. 4 illustrates the fuse module 22 of the first embodiment as a single component. This fuse module 22 has a rectangular fuse circuit board 31 made of a printed wiring board such as a glass epoxy board, a pair of fuse circuit elements 32 mounted on a surface of the fuse circuit board 31, six main terminals 33 provided on the fuse circuit board 31 so as to be arranged in a straight line along one long side of the fuse circuit board 31 and four control terminals 34, two pairs of which are provided at respective end portions located in a longitudinal direction of the fuse circuit board 31. The fuse circuit elements 32 each have a flat rectangular package, and these two fuse circuit elements 32 are aligned with each other in the longitudinal direction of the fuse circuit board 31.

Here, the main terminal 33 is formed by a circular through hole 33a penetrating the fuse circuit board 31 in a thickness direction and an annular conductive land portion 33b provided so as to surround a circumference of the through hole 33a. The land portion 33b is formed on at least one surface of the fuse circuit board 31 which is a component mounting surface on which the fuse circuit elements 32 are mounted, but it is preferable that the land portions 33b be provided on both surfaces including a back surface of the fuse circuit board 31. It is noted that an inner circumferential surface of the through hole 33a is plated with conductive metal, and this plated layer is electrically connected to the land portion 33b.

Each control terminal 34 has a pin shape that stands like a substantially L-shape. The control terminal 34 is connected to the fuse circuit board 31, for instance, by soldering.

The two fuse circuit elements 32 mounted on the fuse circuit board 31 correspond to the two systems of the motor 1A respectively. That is, one of the fuse circuit elements 32 corresponds to each phase of U, V and W of the first system, and the other of the fuse circuit elements 32 corresponds to each phase of U, V and W of the second system. Each three of the six main terminals 33 correspond to each fuse circuit element 32. Similarly, the pair of control terminals 34 located at one end portion of the fuse circuit board 31 corresponds to the one fuse circuit element 32, and the other pair of control terminals 34 located at the other end portion of the fuse circuit board 31 corresponds to the other fuse circuit element 32.

As depicted in FIG. 3, the main terminals 33 of the fuse module 22 are soldered or welded (e.g. TIG-welded) to wire terminal portions 36 which are made of wire other ends of the coils and protrude from the bottom wall portion 9 of the housing 7 respectively. The control terminals 34 are connected to the aforementioned circuit board 3 by soldering. The fuse module 22 is fixed by soldering or welding the main terminals 33 to the respective wire terminal portions 36.

That is, the six wire terminal portions 36 are arranged in a row (or in line) on the bottom wall portion 9 of the housing 7. Each wire terminal portion 36 is a portion formed by extending the coil wire itself in a straight line. The wire terminal portions 36 each protrude from the bottom wall portion 9 so as to be orthogonal to the bottom wall portion 9, i.e. in an attitude in which each wire terminal portion 36 extends parallel to the rotation shaft 6. In the same manner as the above described wire terminal portions 25 of the inverter modules 21, these wire terminal portions 36 penetrate the bottom wall portion 9 through an opening 26 of the bottom wall portion 9. More specifically, a plug member 41 made of insulating material (e.g. insulating synthetic resin) is attached or fitted to the opening 26 that opens so as to have an elongated ellipse shape, and the wire terminal portions 36 penetrate six penetration holes formed at this plug member 41 according to wire diameters, then stand. Three of the six wire terminal portions 36 correspond to the coils of U-phase, V-phase and W-phase of the first system, and the remaining three correspond to the coils of U-phase, V-phase and W-phase of the second system.

These wire terminal portions 36 are then soldered or welded to the respective land portions 33b with the wire terminal portions 36 inserted into the respective through holes 33a forming the main terminals 33 of the fuse circuit board 31.

Figure 5:
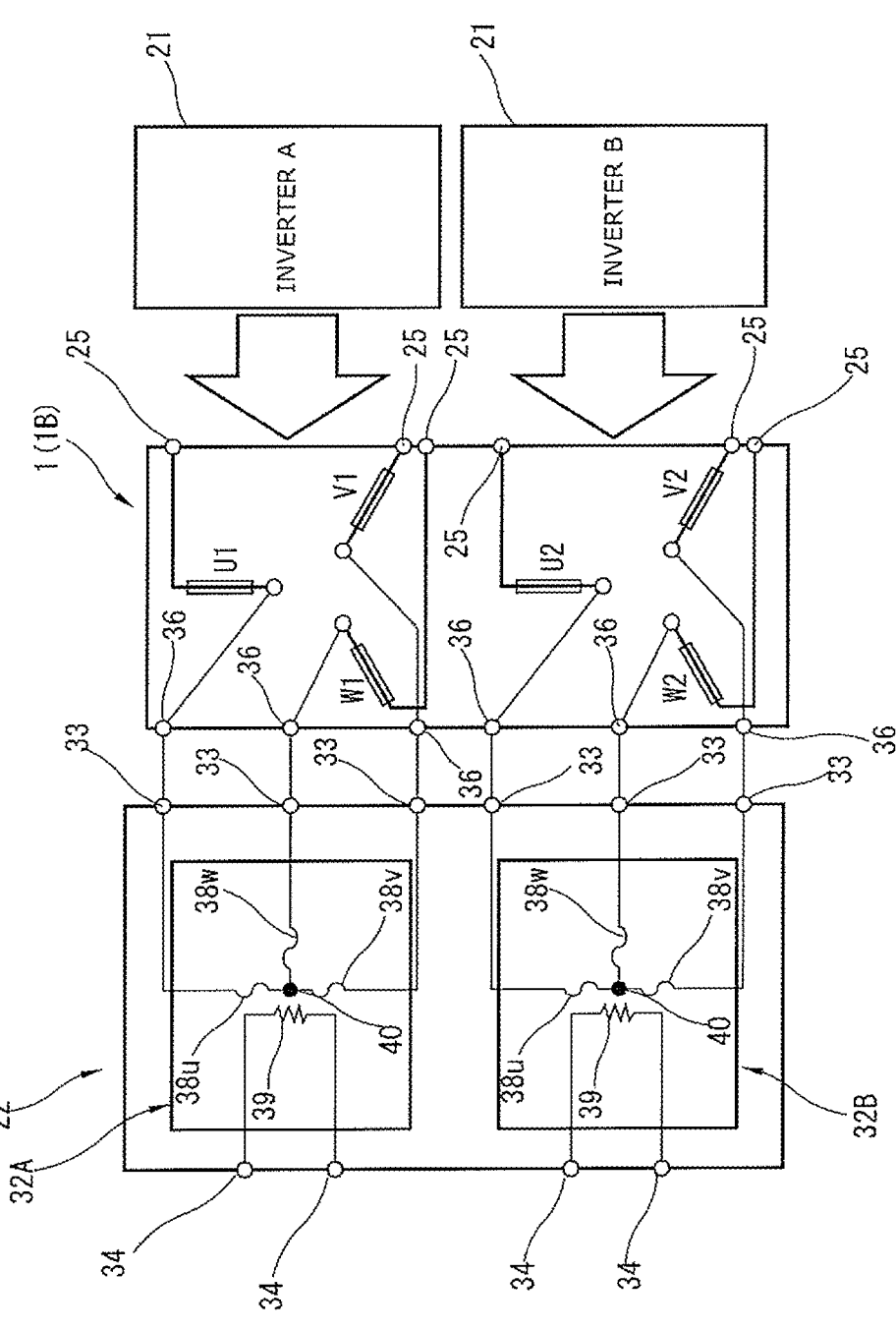
FIG. 5 is a circuit diagram showing a configuration of a fuse circuit.

FIG. 5 is a circuit diagram showing a fuse circuit configured by the fuse module 22 together with circuit configurations of the inverter modules 21 and the motor 1A. The fuse circuit forms a part of the power supply circuit. As illustrated in FIG. 5, the motor 1A has coils U1, V1 and W1 of the three phases which form the first system and coils U2, V2 and W2 of the three phases which form the second system. One ends of the coils U1, V1 and W1 of the first system are formed as the respective wire terminal portions 25, and connected to output terminals (the main terminals 21a of the inverter module 21) of an inverter circuit (denoted as an "inverter A" in the drawing) configured by the one inverter module 21 respectively. Likewise, one ends of the coils U2, V2 and W2 of the second system are formed as the respective wire terminal portions 25, and connected to output terminals (the main terminals 21a of the inverter module 21) of an inverter circuit (denoted as an "inverter B" in the drawing) configured by the other inverter module 21 respectively.

The other ends of the coils U1, V1 and W1 of the first system are formed as the respective wire terminal portions 36, and connected to the three main terminals 33 of the fuse module 22 respectively. These three main terminals 33 correspond to the first fuse circuit element 32 (denoted by a reference sign 32A). The first fuse circuit element 32 (32A) has fuses 38 (38u, 38v and 38w) provided in phase circuits (or phase lines) of the phases U, V and W respectively and a heater 39 for blowing out these fuses 38. These three fuses 38 and the heater 39 are sealed or enclosed in a package. Here, the phase lines of the phases U, V and W, having the respective fuses 38, are connected together at a neutral point 40 inside the first fuse circuit element 32 (32A).

That is, the phase lines of the phases of U, V and W including the coils U1, V1 and W1 of the first system are connected as so-called Y-connection at the neutral point 40 inside the first fuse circuit element 32 (32A). Then, the fuses 38 (38u, 38v and 38w) are positioned in the respective phase lines between the respective coils U1, V1 and W1 and the neutral point 40.

The heater 39 is connected to the pair of control terminals 34 that are adjacent to the first fuse circuit element 32 (32A). When it is necessary to cut off the phase line for fail-safe due to some abnormality, a predetermined power is supplied to the heater 39 as a cut-off signal from a control circuit configured by the circuit board 3, and the fuse 38 is blown out by heat generated by the heater 39.

The second system is also configured in the same manner as the first system. The other ends of the coils U2, V2 and W2 of the second system are formed as the respective wire terminal portions 36, and connected to the three main terminals 33 of the fuse module 22 respectively. These three main terminals 33 correspond to the second fuse circuit element 32 (denoted by a reference sign 32B). The second fuse circuit element 32 (32B) has fuses 38 (38u, 38v and 38w) provided in phase circuits (or phase lines) of the phases U, V and W respectively and a heater 39 for blowing out these fuses 38. These three fuses 38 and the heater 39 are sealed or enclosed in a package. The phase lines of the phases U, V and W, having the respective fuses 38, are connected together at a neutral point 40 inside the second fuse circuit element 32 (32B).

That is, the phase lines of the phases of U, V and W including the coils U2, V2 and W2 of the second system are connected as so-called Y-connection at the neutral point 40 inside the second fuse circuit element 32 (32B). Then, the fuses 38 (38*u*, 38*v* and 38*w*) are positioned in the respective phase lines between the respective coils U2, V2 and W2 and the neutral point 40.

The heater 39 is connected to the pair of control terminals 34 that are adjacent to the second fuse circuit element 32 (32B). When it is necessary to cut off the phase line for fail-safe due to some abnormality, a predetermined power is supplied to the heater 39 as a cut-off signal from a control circuit configured by the circuit board 3, and the fuse 38 is blown out by heat generated by the heater 39.

Therefore, as is clear from FIG. 5, only either one of the first and second systems can be cut off according to conditions, or both of the first and second systems can be cut off according to conditions. It is noted that the motor 1A can drive the electric power steering device by only either one of the first and second systems.

As describe above, in the embodiment, instead of the conventional neutral point relay configured by the switching element provided in each phase line for fail-safe, the fuse circuit is used. Therefore, this can achieve reduction in parts cost and also improve efficiency in motor drive by lowering of a resistance of the phase line.

Further, since the fuse circuit is packaged as the fuse circuit element 32 including the fuses 38, the heater 39 and the neutral point 40, its configuration can be simplified. Furthermore, since the heater 39 is accommodated in the same package, it is possible to cut off the phase line with reliable and stable characteristics.

In addition, in the above embodiment, since the fuse circuit is formed as the fuse module 22 having the fuse circuit board 31 which is provided separately from the circuit board 3, mounting of the fuse circuit (the fuse module 22) in the case (the enclosure) of the electric actuator device can be facilitated. Further, the fuse circuit (the fuse module 22) can be arranged separately from or independently of the circuit board 3 having a number of heat-producing components, thereby reducing a thermal influence from the circuit board 3.

Moreover, with respect to the fuse circuit board 31 of the fuse module 22, the wire terminal portion 36 made of the wire end portion of the stator coil is inserted into the through hole 33*a* as the main terminal 33 without interposing the bus bar etc., and is directly soldered or welded to the land portion 33*b*. Therefore, its configuration is simplified, and also man-hour required for mounting the bus bar can be reduced.

Figure 6:
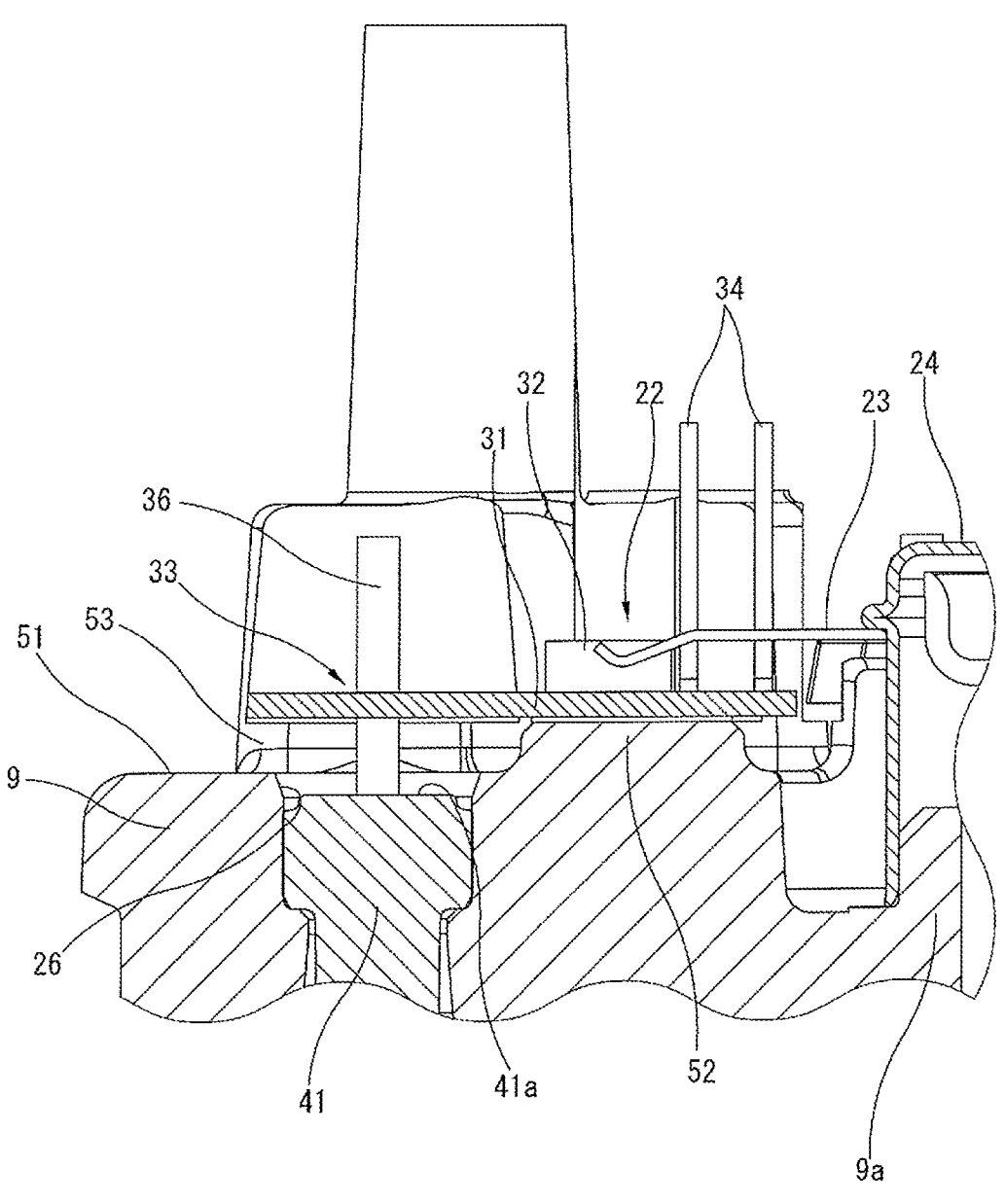
FIG. 6 is a sectional view of a main part, showing aboard supporting structure of the first embodiment.
Figure 7:
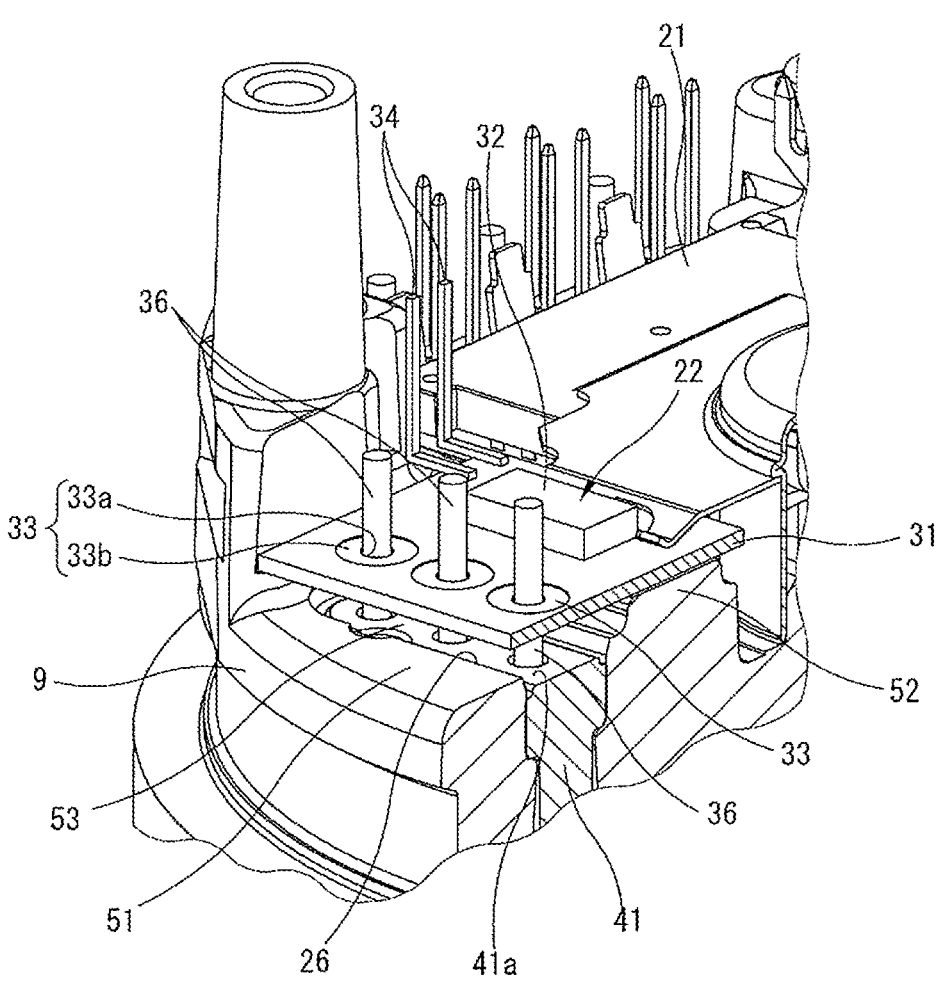
FIG. 7 is a cross-sectional perspective view of the main part, showing the board supporting structure of the first embodiment.

FIGS. 6 and 7 show a supporting structure of the fuse circuit board 31 at the bottom wall portion 9 of the housing 7. In the first embodiment, as illustrated in these FIGS. 6 and 7, a region at a side closer to the rotation shaft 6 with respect to the opening 26 where the six wire terminal portions 36 are arranged is formed as a pedestal portion 52 which is formed relatively high as compared with a flat surface 51 located around the opening 26. Then, a part, in a length in a short-side direction, of the fuse circuit board 31, e.g. approximately half of the fuse circuit board 31, is put on the pedestal portion 52, while the rest, in the length in the short-side direction, of the fuse circuit board 31, i.e. approximately half of the fuse circuit board 31, is situated in a floating state above the flat surface 51 located around the opening 26. That is, the fuse circuit board 31 is supported in a cantilever manner on and by the pedestal portion 52 that serves as a board supporting portion, and the fuse circuit board 31 around peripheries of the through holes 33*a* of the main terminals 33 is separate from the flat surface 51, and a sufficient space 53 is formed between them.

The pedestal portion 52 has an elongated band shape (or an elongated strip shape) in plan view viewed along the axial direction of the rotation shaft 6. As depicted in FIG. 6, most of a region where the fuse circuit element 32 is positioned on the pedestal portion 52. It is noted that an end surface 41*a* of the plug member 41, from which each wire terminal portion 36 protrudes, is located at a position that is recessed with respect to the flat surface 51 of the housing 7, i.e. the end surface 41*a* of the plug member 41 is located at a position that is further separate from the fuse circuit board 31, thereby further expanding the space 53.

In such configuration or structure in which the space 53 is secured between the main terminal(s) 33 of the fuse circuit board 31 and the bottom wall portion 9 of the housing 7, less heat escapes to the housing 7 side during soldering or welding, thereby improving working efficiency of the soldering or the welding. The wire of the stator coil, through which a large current flows, is relatively thick, and is made of copper etc. that has a high thermal conductivity. Because of this, heat tends to escape through the wire during soldering or welding. Therefore, if heat further escapes from the fuse circuit board 31 to the housing 7 during soldering or welding, there is a concern that the soldering or the welding will become difficult. In the above embodiment, a thermal insulation effect can be obtained by forming the space 53, and thus it is possible to solder weld the wire and the land portion 33*b*.

Figure 8:
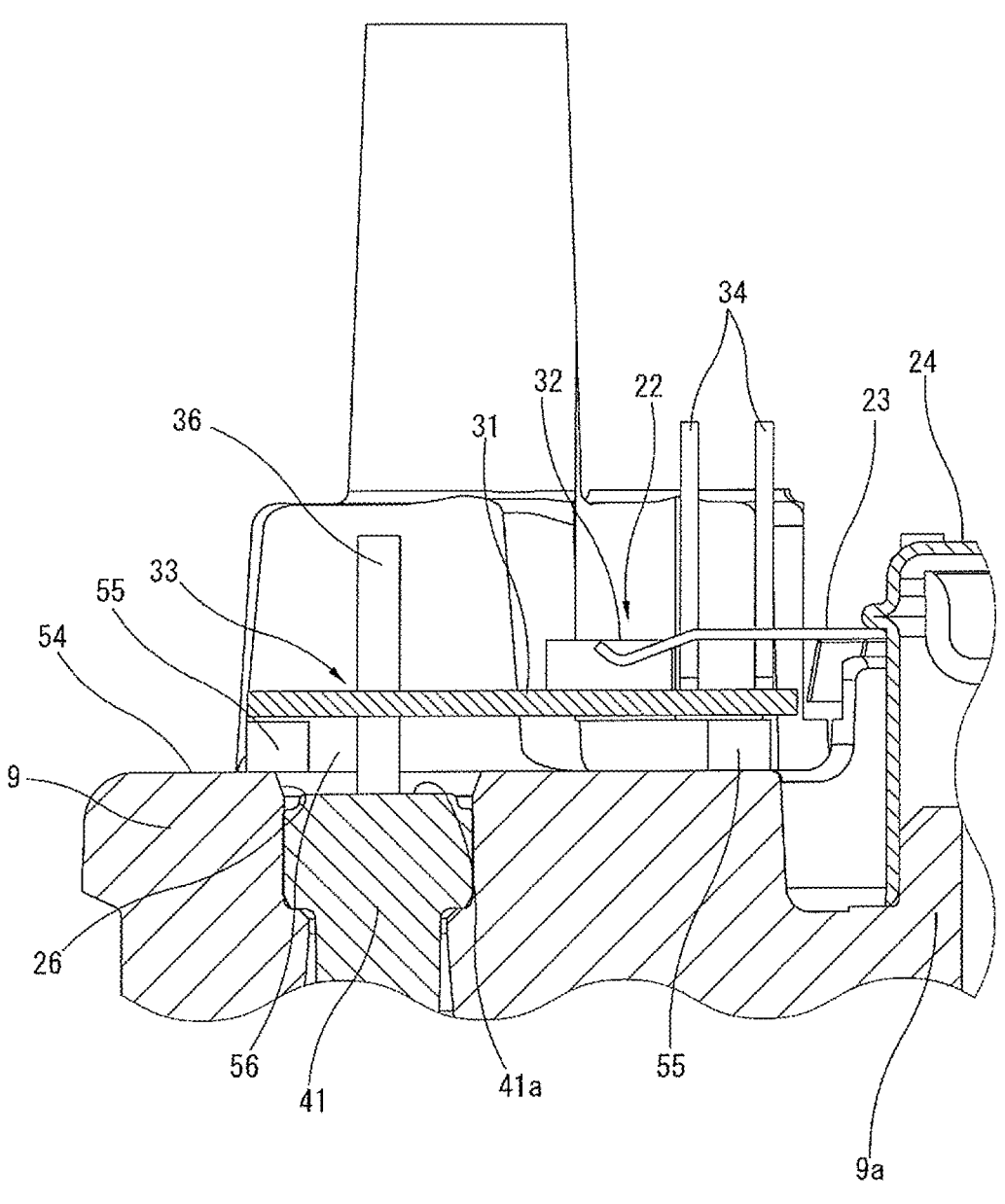
FIG. 8 is a sectional view of a main part, showing a modified board supporting structure of a second embodiment.
Figure 9:
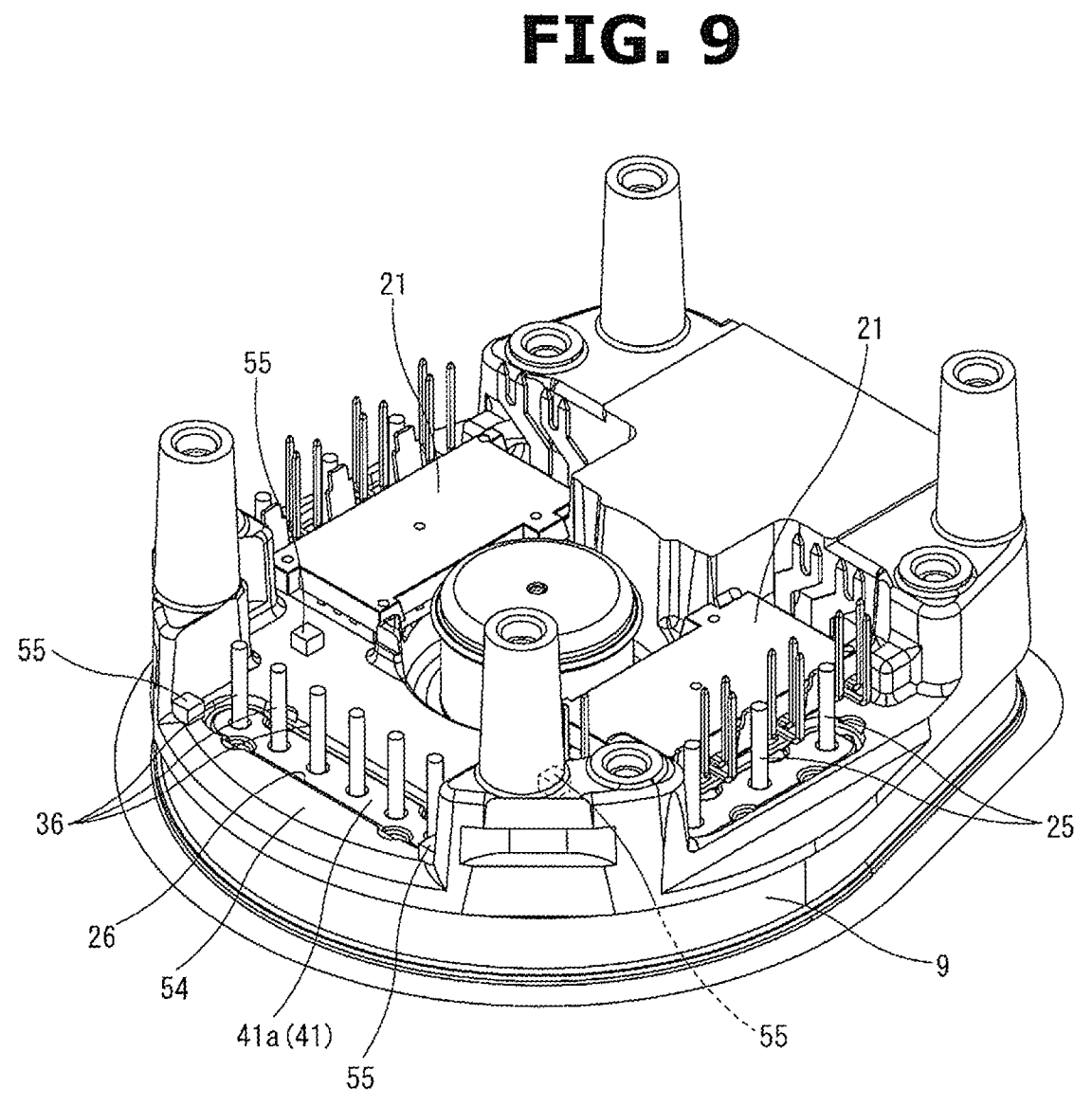

Next, FIGS. 8 and 9 show a second embodiment in which the supporting structure of the fuse circuit board 31 is modified. In this second embodiment, a surface 54 of the bottom wall portion 9 around the opening 26 is formed at the same height throughout an entire area of the fuse circuit board 31. Then, relatively small protruding portions 55 that serve as board supporting portions are formed so as to protrude at four positions of four corners of the surface 54. The four protruding portions 55 support corners of the fuse circuit board 31 respectively. With this supporting structure, a space 56 is formed between the fuse circuit board 31 and the surface 54 of the housing 7.

According to the second embodiment, since the space 56 is formed between the fuse circuit board 31 and the surface 54 of the housing 7 throughout an almost entire surface of the fuse circuit board 31, more reliable thermal insulation is done during soldering or welding.

Further, in the second embodiment, a back surface side of the fuse circuit element 32 mounted on the fuse circuit board 31 is separate from the bottom wall portion 9 of the housing 7, and is in a thermal insulation state. Therefore, the fuse 38 is less susceptible to an external thermal influence. That is, since the fuse 38 is blown out by heat generated by the heater 39, for instance, if heat of the heater 39 escapes to the outside, conversely, if heat is applied to the fuse 38 from the outside, there is a concern that cut-off characteristics will be affected. Therefore, it is preferable that the fuse circuit element 32 be thermally insulated from the outside as much as possible. In the second embodiment, the space 56 between the fuse circuit board 31 and the surface 54 of the housing 7 also contributes to the thermal insulation for the fuse circuit element 32, thereby reducing the thermal influence from the housing 7 during operation.

Figure 10:
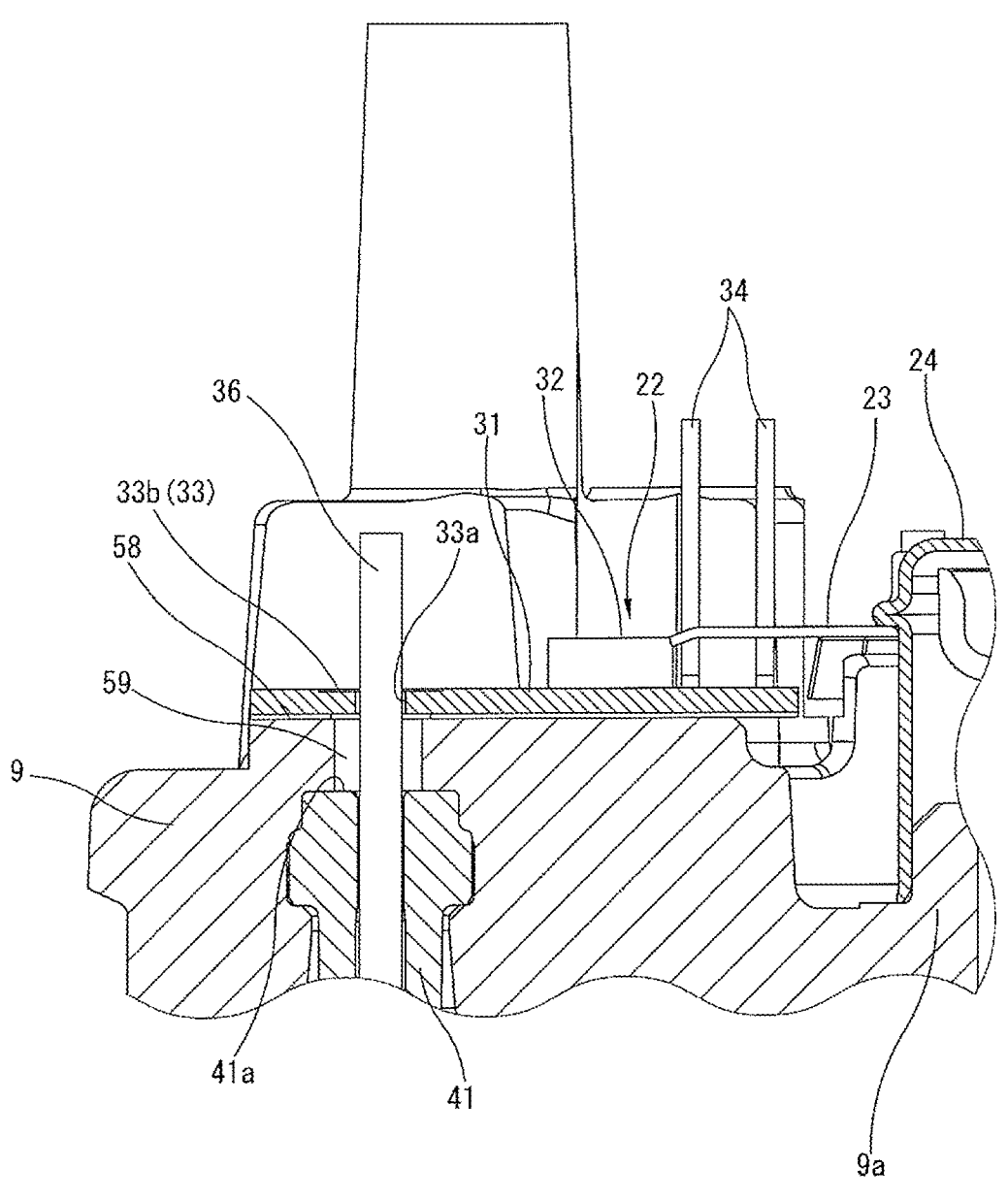
FIG. 10 is a sectional view of a main part, showing a modified board supporting structure of a third embodiment.
Figure 11:
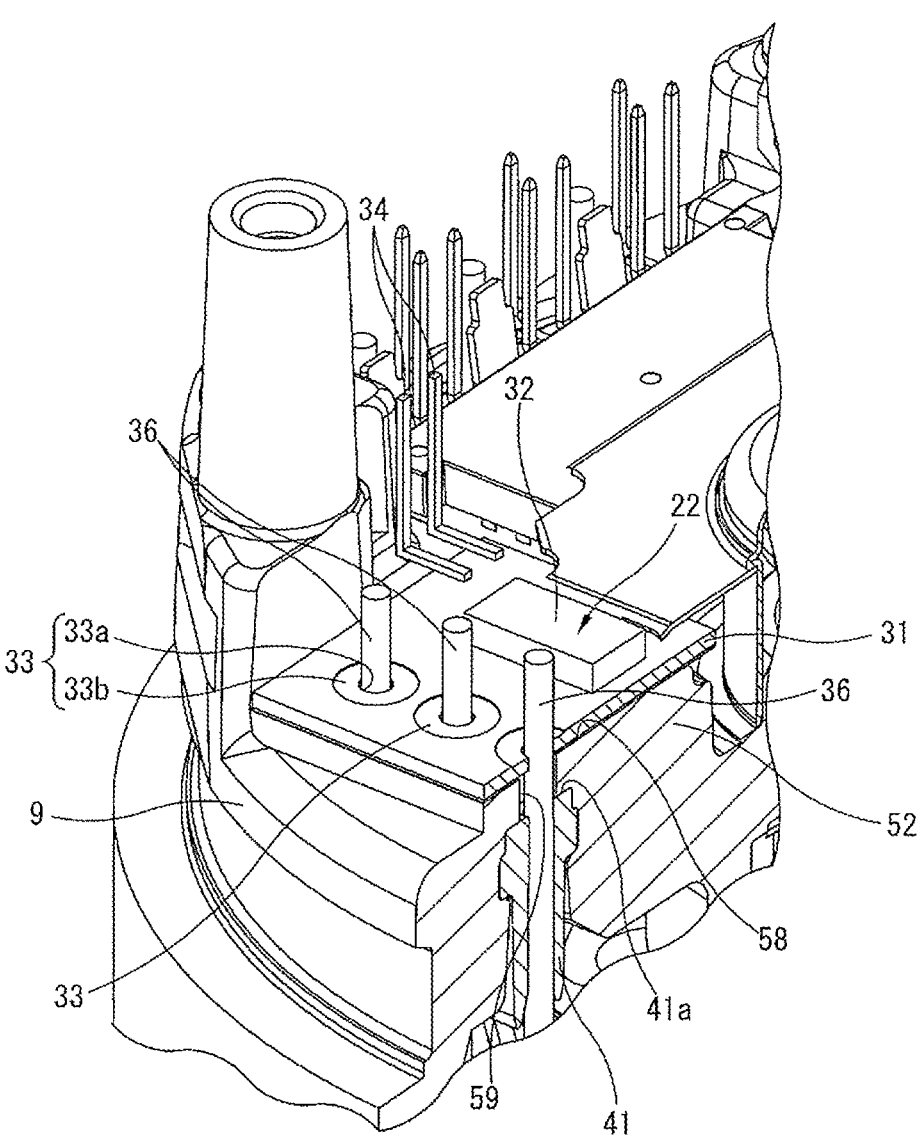
FIG. 11 is a cross-sectional perspective view of the main part, showing the board supporting structure of the third embodiment.

Next, FIGS. 10 and 11 show a third embodiment in which the supporting structure of the fuse circuit board 31 is modified. In this third embodiment, a flat surface 58 with which substantially an entire surface of the fuse circuit board 31 comes into contact, which corresponds to a region where the fuse circuit board 31 is to be placed, is formed at the bottom wall portion 9 of the housing 7. This surface 58 serves as a board supporting portion. The six wire terminal portions 36 penetrate the surface 58 and linearly extend to the fuse circuit board 31 side, and penetrate the through holes 33a of the main terminals 33 respectively.

Here, a recessed portion 59 formed as a hole that is arranged concentrically with the wire terminal portion 36 is formed around each wire terminal portion 36. That is, in this embodiment, the plug member 41 is not exposed to the surface of the bottom wall portion 9 of the housing 7, but its end surface 41a is covered with the bottom wall portion 9 of the housing 7. Then, a cylindrical hole is formed between the surface 58 of the bottom wall portion 9 and the end surface 41a of the plug member 41, then the recessed portion 59 is formed with the end surface 41a being a bottom of the recessed portion 59. By this recessed portion 59, a space is formed between the fuse circuit board 31 and the end surface 41a of the plug member 41 around each through hole 33a. It is desirable that a diameter of the circular recessed portion 59 be at least larger than a diameter of the land portion 33b located on a lower surface side of the fuse circuit board 31.

According to the third embodiment, a lower surface side of the main terminal 33 does not come into close contact with the bottom wall portion 9 of the housing 7, and the space is formed by the recessed portion 59. Therefore, in the same manner as the first and second embodiments, during soldering or welding, thermal insulation is done, and less heat escapes to the housing 7.

Figure 12:
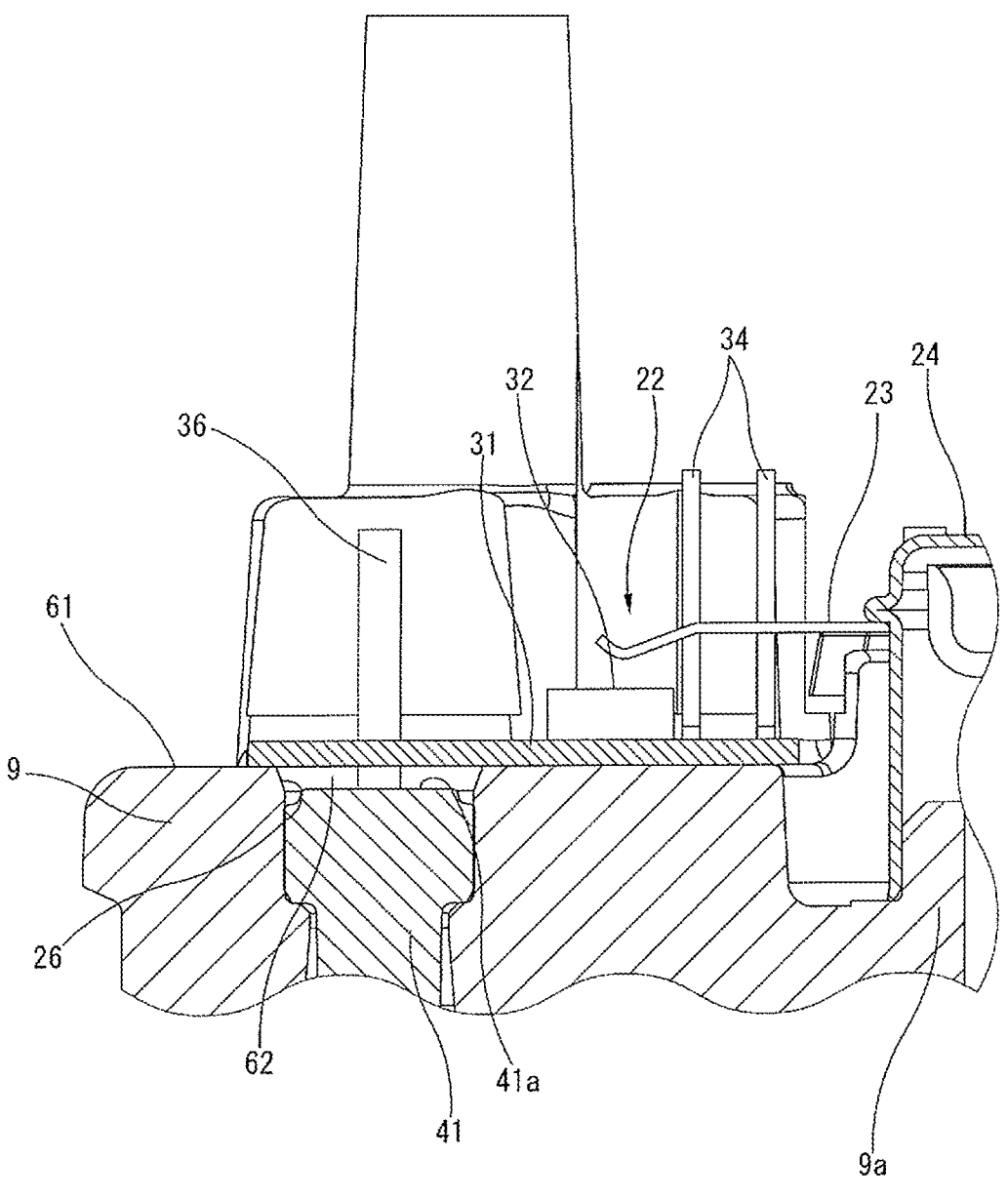
FIG. 12 is a sectional view of a main part, showing a modified board supporting structure of a fourth embodiment.
Figure 13:
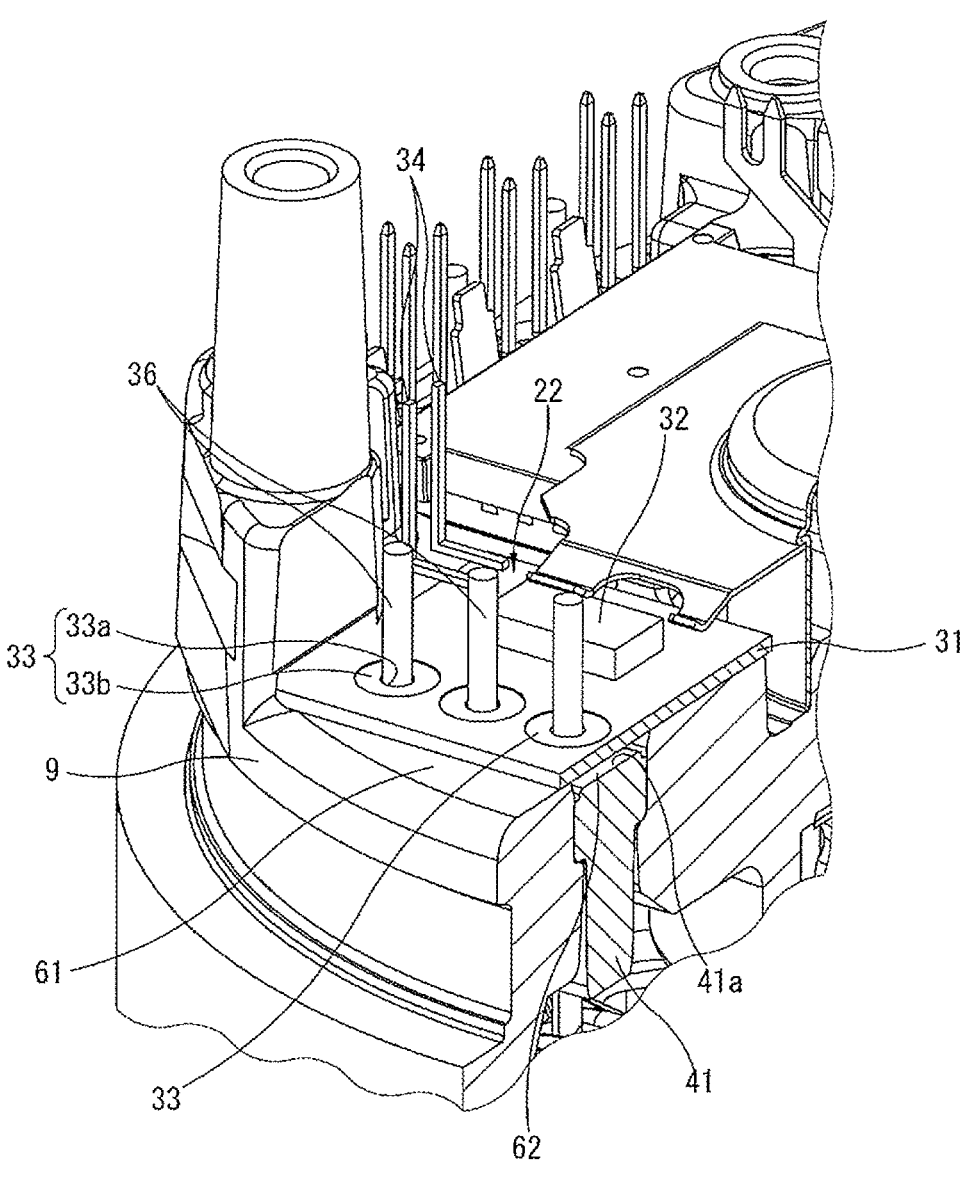
FIG. 13 is a cross-sectional perspective view of the main part, showing the board supporting structure of the fourth embodiment.

Next, FIGS. 12 and 13 show a fourth embodiment in which the supporting structure of the fuse circuit board 31 is modified. In this fourth embodiment, a flat surface 61 that serves as a board supporting portion, which corresponds to a region where the fuse circuit board 31 is to be placed, is formed. On this surface 61, the opening 26 having an elongated ellipse shape, into which the plug member 41 where the six wire terminal portions 36 are arranged is fitted, is open. The fuse circuit board 31 comes into contact with a circumference of the opening 26. Here, the end surface 41a of the plug member 41 is recessed from the surface 61 in the opening 26, thereby forming a space 62 between the fuse circuit board 31 and the end surface 41a.

Also in this fourth embodiment, since the space 62 is secured on the lower surface sides of the main terminals 33 of the fuse circuit board 31, less heat escapes to the housing 7 side during soldering or welding, thereby improving working efficiency of the soldering or the welding.

Figure 14:
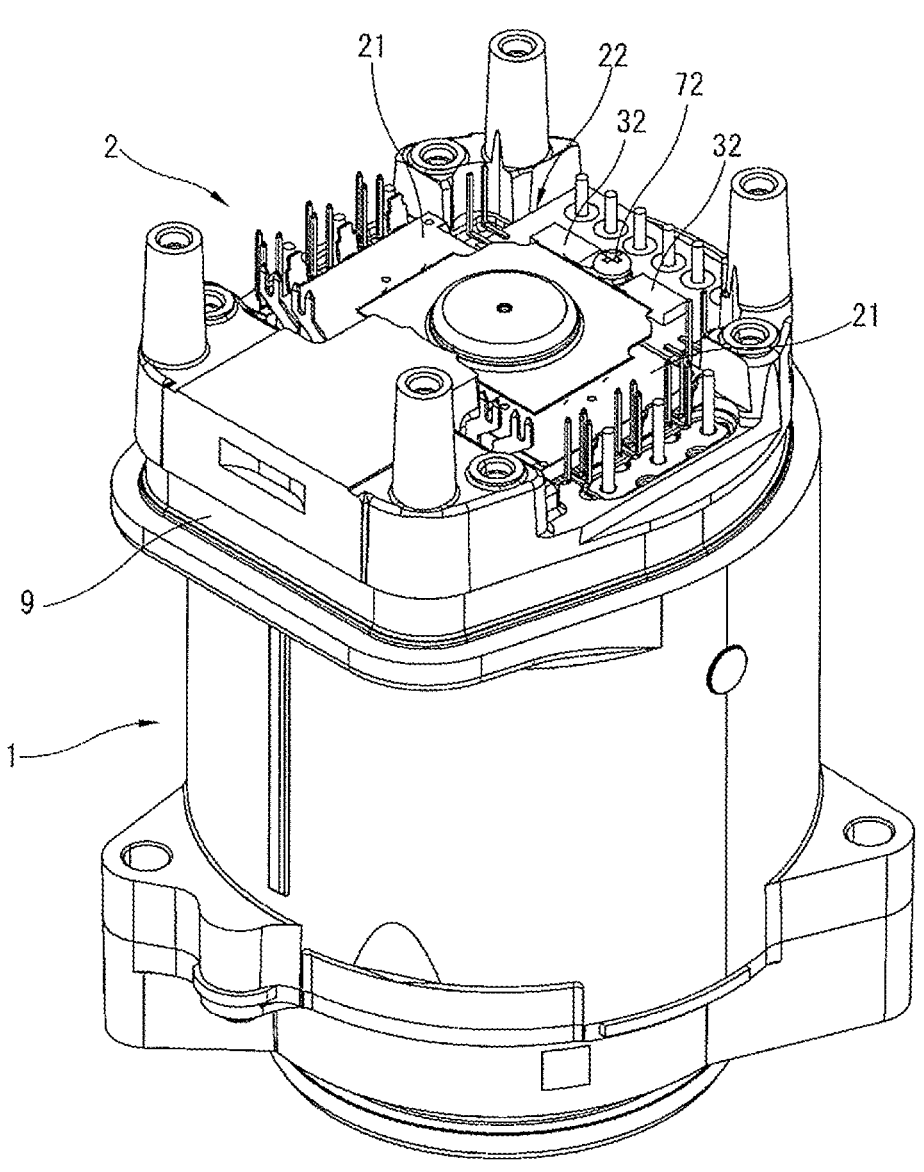
FIG. 14 is a perspective view of an electric actuator device having a fuse module according to a fifth embodiment.
Figure 15:
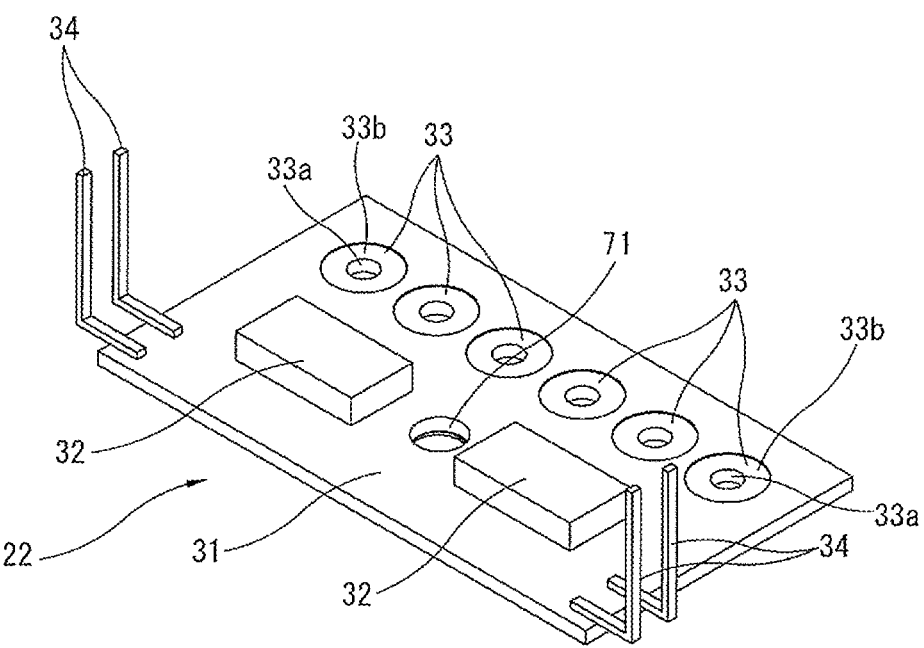
FIG. 15 is a perspective view of the fuse module of the fifth embodiment.

Next, FIGS. 14 and 15 show a fifth embodiment in which the fuse module 22 is modified. FIG. 14 is a perspective view of the electric actuator device having the fuse module 22 of the fifth embodiment. FIG. 15 is a perspective view showing the fuse module 22 of the fifth embodiment as a single component.

In this fifth embodiment, a penetration hole 71 is formed in the middle of the fuse circuit board 31 (i.e. between the two fuse circuit elements 32), and the fuse module 22 is fixed to the bottom wall portion 9 with a screw 72 that is inserted into the penetration hole 71. Therefore, the fuse module 22 can be supported more firmly. In particular, since the fuse circuit board 31 is firmly fixed to the housing 7 before soldering or welding the wire terminal portions 36 to the respective main terminals 33, the soldering or the welding is facilitated.

Although the embodiments of the present invention are described in detail above, the present invention is not limited to the above embodiments, but includes various modifications. For instance, in the above embodiments, the two fuse circuits of the two systems are provided for the two stator coils of the two systems. However, if the electric motor is a motor having only one stator coil of one system, one fuse circuit of the one system is possible. Further, the specific configuration and the arrangement etc. of the fuse circuit are not limited to the above embodiments.

In addition, in the above embodiments, the fuse circuit board 31 was described as an example. However, the present invention can be applied to the small-sized circuit board for the neutral point relays like Patent Document 1. Further, the present invention can also be applied to the support of the inverter module 21.

Moreover, the present invention is not limited to the above motor drive device of the electric actuator device for the power steering device, but can be applied to various kinds of electric motors.

As described above, in the present invention, a motor drive device which is structured integrally with an electric motor having stator coils and drives and controls the electric motor, the motor drive device comprises: a plurality of wire terminal portions arranged so as to linearly protrude at an end portion of a housing accommodating therein the electric motor, wherein the wire terminal portions are made of respective wire one ends of the stator coils; a circuit board having a plurality of through holes into which the wire terminal portions are inserted respectively, wherein the circuit board mounts thereon a part of a power supply circuit supplying power to the stator coils; and a board supporting portion supporting the circuit board so that a space is formed between the circuit board and an outer surface, which faces the circuit board, of the housing at least around each through hole, wherein the wire terminal portions inserted into the respective through holes through the space are soldered or welded to land portions of the through holes.

As a preferable motor drive device, a fuse circuit, as the part of the power supply circuit, which is configured to be able to cut off a phase circuit extending from the stator coil of each phase to a neutral point in response to a cut-off signal from a control circuit is mounted on the circuit board.

For instance, the fuse circuit is accommodated, as a fuse circuit element including a plurality of fuses corresponding to a plurality of phase lines and a heater blowing out the fuses, in a package, and the fuse circuit element is mounted on the circuit board.

As a preferable motor drive device, a plurality of board supporting portions are formed into a protruding shape around a region where the plurality of wire terminal portions protrude at the housing, and the circuit board is supported by the plurality of board supporting portions at a position separate from a surface of the housing where the plurality of wire terminal portions protrude, and the space is formed by this supporting structure.

As a far preferable motor drive device, on the circuit board, the plurality of through holes are arranged in a row along one side of the circuit board having a rectangular shape, and the circuit board is supported in a cantilever manner at an opposite side portion to the one side of the circuit board by the board supporting portion, and the space is formed by this supporting structure.

As another preferable motor drive device, the circuit board is supported with the circuit board being in contact with a surface, which serves as the board supporting portion, of the housing, recessed portions that individually enclose the wire terminal portions are formed on the surface of the housing, and the space is formed by each recessed portion.

The invention claimed is:
1. A motor drive device which is structured integrally with an electric motor having stator coils and drives and controls the electric motor, the motor drive device comprising:

a plurality of wire terminal portions arranged so as to linearly protrude at an end portion of a housing accommodating therein the electric motor, wherein the wire terminal portions are made of respective wire one ends of the stator coils, and are arranged in a straight line;

a circuit board having a plurality of through holes into which the wire terminal portions are inserted respectively, wherein the circuit board mounts thereon a part of a power supply circuit supplying power to the stator coils; and a board supporting portion supporting the circuit board so that a space is formed between the circuit board and an outer surface, which faces the circuit board, of the housing at least around each through hole, wherein the wire terminal portions inserted into the respective through holes through the space are soldered or welded to land portions of the through holes, wherein the circuit board is supported, with the circuit board being in contact with a surface, which serves as the board supporting portion, of the housing, wherein recessed portions that individually enclose the wire terminal portions arranged in the straight line are formed on the surface of the housing, and wherein the space is formed by each recessed portion.

2. The motor drive device as claimed in claim 1, wherein a fuse circuit, as the part of the power supply circuit, which is configured to be able to cut off a phase circuit extending from the stator coil of each phase to a neutral point in response to a cut-off signal from a control circuit is mounted on the circuit board.

3. The motor drive device as claimed in claim 2, wherein the fuse circuit is accommodated, as a fuse circuit element including a plurality of fuses corresponding to a plurality of phase lines and a heater blowing out the fuses, in a package, and the fuse circuit element is mounted on the circuit board.

* * * * *